(12) United States Patent
Lacombe et al.

(10) Patent No.: US 8,244,453 B2
(45) Date of Patent: Aug. 14, 2012

(54) METHOD AND DEVICE FOR ADJUSTING THE TRAJECTORY OF AN AIRCRAFT IN A CLIMB CIRCUIT

(75) Inventors: Antoine Lacombe, Monferran-Saves (FR); Xavier Blanchon, Toulouse (FR); François Coulmeau, Seilh (FR)

(73) Assignee: Thales (FR)

( * ) Notice: Subject to any disclaimer, the term of this patent is extended or adjusted under 35 U.S.C. 154(b) by 303 days.

(21) Appl. No.: 12/766,892

(22) Filed: Apr. 25, 2010

(65) Prior Publication Data
US 2010/0274419 A1 Oct. 28, 2010

(30) Foreign Application Priority Data
Apr. 28, 2009 (FR) ..................... 09 02065

(51) Int. Cl.
*G05D 1/00* (2006.01)
(52) U.S. Cl. .......... 701/122; 701/120; 701/4; 244/76 R
(58) Field of Classification Search ................. 701/3, 4, 701/8, 120–122; 340/945, 951; 244/76 R
See application file for complete search history.

(56) References Cited

U.S. PATENT DOCUMENTS

| 6,847,866 | B2* | 1/2005 | Gaier ................................. 701/4 |
| 7,152,332 | B1* | 12/2006 | Jain et al. ...................... 33/1 SD |
| 7,370,790 | B2* | 5/2008 | Martincikova et al. .. 235/61 NV |
| 2002/0193915 | A1* | 12/2002 | Miller ................................ 701/3 |
| 2004/0122567 | A1 | 6/2004 | Gaier |
| 2005/0004745 | A1* | 1/2005 | Rumbo et al. ................ 701/200 |
| 2006/0012492 | A1* | 1/2006 | Degidio ........................ 340/971 |
| 2007/0129855 | A1 | 6/2007 | Coulmeau |
| 2009/0005918 | A1 | 1/2009 | Sacle et al. |

FOREIGN PATENT DOCUMENTS

| EP | 1 796 060 A1 | 6/2007 |
| FR | 2 915 824 A1 | 11/2008 |

OTHER PUBLICATIONS

Arthur P. Smith, et al., "Management of Holding Patterns: A Potential ADS-B Application", Digital Avionics Systems Conference, Oct. 26, 2008, pp. 3.D.2-1 thru 3.D.2-11, IEEE, Piscataway, N.J., USA, XP031372592.

* cited by examiner

*Primary Examiner* — Drew Brown
(74) *Attorney, Agent, or Firm* — Baker & Hostetler, LLP (57) ABSTRACT

A method of adjusting the trajectory of an aircraft flying a climb circuit, of substantially helical form corresponding to a succession of racetracks, denoted HOLD, the last HOLD, called the exit HOLD, having predefined geometric characteristics and comprising a lock-on point, allowing the aircraft to enter and to exit in the HOLD, the aircraft attaining the setpoint altitude of the climb circuit during the flight of the exit HOLD, comprises at least three steps, including: a step of computing the prediction of the position of the aircraft when the setpoint altitude will be attained; a step of computing the remaining distance to be traveled, between the position of the aircraft when the setpoint altitude will be attained and the lock-on point; and a step making it possible to carry out an adaptation of the form of the exit HOLD so as to minimize the remaining distance to be traveled DELTA.

12 Claims, 5 Drawing Sheets

METHOD AND DEVICE FOR ADJUSTING THE TRAJECTORY OF AN AIRCRAFT IN A CLIMB CIRCUIT

CROSS-REFERENCE TO RELATED APPLICATIONS

This application claims priority to foreign France patent application No. 0902065, filed on Apr. 28, 2009, the disclosure of which is hereby incorporated by reference in its entirety.

FIELD OF THE INVENTION

The present invention relates to the field of climb procedures for an aircraft flying an altitude climb circuit, generally situated in proximity to an airport before commencing the cruising flight. More particularly, it relates to methods making it possible to optimize exit from an altitude climb circuit.

BACKGROUND OF THE INVENTION

The growth of automation in avionics, both civilian and military, is leading crews to make ever more use of electronic systems, and to have ever less direct influence on the aircraft's primary piloting controls. This automation makes it possible to decrease piloting risks and to standardize notably conventional flight procedures.

This trend has been accentuated with the generalization of flight management systems such as FMS, the acronym standing for Flight Management System.

A flight management system comprises various functional components which allow the crew to programme a flight using a navigation database. The system then computes a lateral and vertical trajectory making it possible to reach the destination of the flight plan. These computations are based on the characteristics of the aircraft and data provided by the crew and the environment of the system. The positioning and guidance functions collaborate to help the aircraft to remain on this trajectory.

The interface functions for interfacing with the crew and with the ground make it possible to put a human into the navigation loop since he alone is responsible for the progress of the flight.

In a flight management system, the pilot programmes his climb procedure into his FMS system. Certain procedures contain climb waiting circuits, termed "ascents", to guarantee the aircraft margins in relation to the relief or conflicting traffic.

Certain airports are enclosed or require that an aircraft taking off should attain a certain setpoint altitude before beginning its cruising flight. The aircraft is therefore piloted in such a way that it flies an altitude climb circuit, the circuit being predefined and more often than not standardized.

More often than not the climb circuits have the form of a substantially helical trajectory comprising a certain number of portions of trajectories, whose 2D projections at constant altitude represent racetrack shapes, on which the aircraft climbs in a spiral.

The aircraft climbs in a spiral trajectory, the projection of whose complete waiting climb circuit represents a series of concentric racetracks. In aeronautical terminology these racetracks are also called HOLDs and it possesses geometric characteristics specific to the aircraft.

In the subsequent description either the substantially helical 3D trajectory portion whose 2D projection forms a racetrack or the 2D projection itself forming a racetrack, will be called a HOLD.

The aircraft is taken to a predefined altitude on a climb circuit, the latter comprising a certain number of HOLDs, the last of which is called the exit HOLD. Each HOLD comprises an entry point and an exit point, generally these points are the same, also called the lock-on point. The aircraft terminates its climb circuit by passing over the lock-on point.

In aeronautical terminology, it is also said that a point is sequenced from the point of view of the computer of the FMS when it is traversed by the aircraft.

Figure 1:
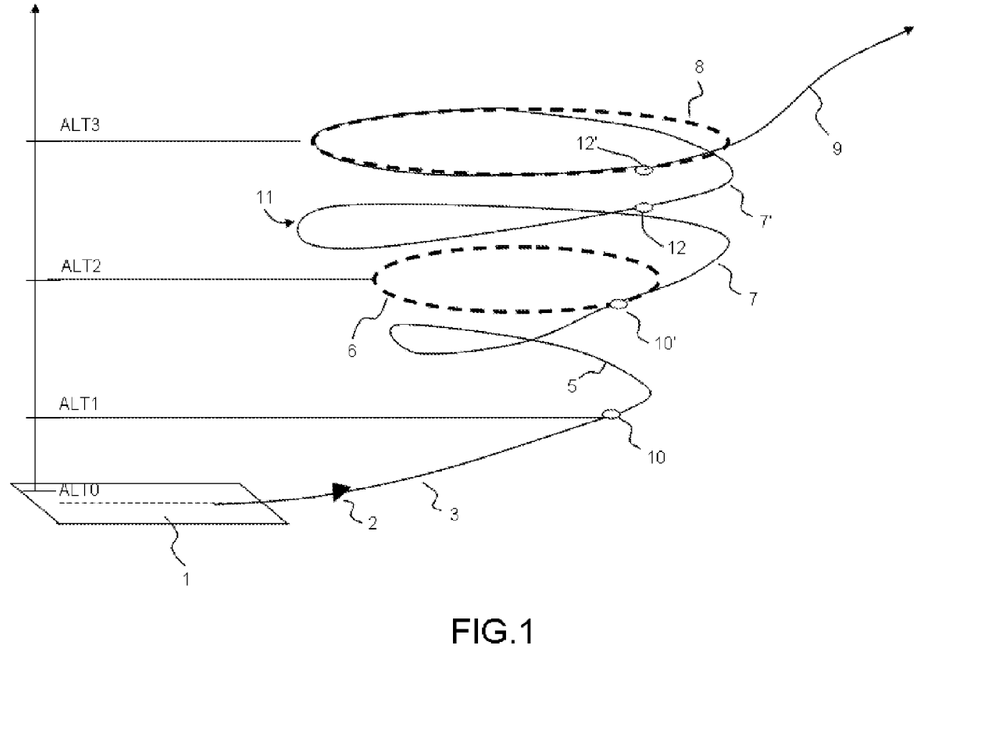
FIG. 1: a complete climb circuit having substantially the form of a helical of the prior art.

FIG. 1 represents a climb circuit 11 flown by an aircraft 2 after a takeoff on a landing runway 1.

The landing runway is situated at an altitude ALT0. In this typical case, the aircraft must travel the climb circuit 11 so as to attain a setpoint altitude ALT3 allowing it to reach its cruising trajectory 9.

A first trajectory portion 3 allows the aircraft 2 to reach a zone in which the climb circuit 11 is situated. The climb circuit 11 comprises a succession of spirals 5, 7, 7' of substantially helical form allowing the aircraft to reach the setpoint altitude and to exit the climb circuit thereafter.

Each spiral comprises an entry point and an exit point 10, 10', 12, 12' which have the same coordinates in latitude and in longitude.

The spirals when they are projected at constant altitude have the form of racetracks 6, 8.

The entry point to the first HOLD 5 is the point 10, the exit point from the first HOLD 5 is the point 10'. The entry point to the second HOLD 7' is the point 12, the exit point from the second HOLD 7' is the point 12'.

A transition trajectory portion 7 allows the aircraft to join the first HOLD to the second HOLD, the first HOLD having a smaller circumference than the second HOLD, the aircraft widens its trajectory during its climb by passing from one HOLD to another.

The aircraft leaves the last HOLD, called the exit HOLD, at the point 12' so as to continue its climb or reach a cruising trajectory 9.

The points 12 and 12' have the same latitude and the same longitude. Likewise the points 10 and 10' have the same latitude and the same longitude.

It is understood in FIG. 1 that when the aircraft 2 has attained its setpoint altitude ALT3 corresponding to the altitude of the racetrack 8, it must nonetheless travel a constant-altitude trajectory portion of the exit HOLD in order to reach the lock-on point 12' before exiting the climb circuit.

The trajectory of a climb circuit is generally generated automatically using the computer of an FMS. The pilot enters the aircraft parameters so as to compute the arrival point at the setpoint altitude allowing the aircraft to exit the climb circuit.

Aerial standards require that the aircraft must pass through the lock-on point of the climb circuit before reaching its cruising trajectory.

A problem with this type of automatic trajectory generation is that it is not optimized, the aircraft more often than not arrives in the exit HOLD at the desired altitude well before traversing the lock-on point. This constraint makes it neccesary to needlessly fly portions of the climb circuit at the required altitude before attaining the lock-on point.

Nonetheless, certain solutions exist for reducing costs and needless fuel expenditure when flying a constant-altitude waiting or climb circuit. The most direct means is to decrease the needless trajectory portions through the intervention of the pilot so as to reach the lock-on point as rapidly as possible once the exit setpoint has been attained. In a climb circuit, generally the exit setpoint is an altitude setpoint, but when overflying a waiting HOLD with a view to landing, it may involve a time setpoint for example.

Among the procedures that it must be possible to adjust to decrease the needless trajectories is the adjustment of the waiting circuits.

Honeywell's patent US2004122567 proposes that the size of a waiting circuit be adjusted manually in a reactive manner, within the framework of a particular procedure, called IMMEDIATE EXIT.

This patent comprises two drawbacks. First of all it is reactive, that is to say the method for optimizing the waiting circuit is performed during overflight thereof, it is necessary for the aircraft to be in a condition of flight of the waiting circuit in order to modify this portion. The method is therefore not predictive, thereby constituting a limitation in the adaptation of the aircraft's trajectory so as to exit the waiting circuit. Moreover this patent does not deal with circuits having ascent or descent trajectories, furthermore it deals with exit optimization for manually flown racetracks.

The applicant has also filed French patent application FR 2915824. This document describes a method for optimizing a waiting circuit. In the waiting phase the aircraft execute successive racetrack-shaped trajectories at isoaltitude during a waiting time D indicated by the air traffic control. These racetrack-shaped trajectories are predetermined in the computer and have an identical circumference. This method makes it possible to modify the size of the last predetermined trajectory so that the end of execution of a trajectory corresponds to the indicated end-of-waiting time. This method computes a whole number of trajectories that are predetermined in a time constraint. As a function of the flight time remaining (less than the time to execute a whole trajectory), the method computes a new exit trajectory that is less than a whole predetermined trajectory, either a circle, or one or two racetracks whose branches have been modified.

However, this method does not make it possible to solve the problem of optimizing an ascent circuit for the following reasons. Firstly, the ascent circuit necessarily comprises transition trajectories between the spirals whose projection on a horizontal plane forms the HOLDs. Secondly, in an ascent circuit the aircraft executes spirals whose projections on an isoaltitude plane form a HOLD but it does not travel a HOLD trajectory. Thirdly, the HOLDs of the ascent circuit are not all of equal periphery.

In so far as the objective of the climb circuit is to allow the aircraft to attain a setpoint altitude, the trajectory portion of the last lap which the aircraft turns at constant altitude is of no benefit except to bring the aircraft back to the lock-on point so as to exit this segment.

Today, the problem is not solved, the climb circuit is not optimized and the aircraft exits the climb circuit only when the lock-on point is sequenced. Drawbacks are that the aircraft loses time and fuel in looping around its climb circuit before reaching a cruising trajectory.

SUMMARY OF THE INVENTION

The method of the invention makes it possible notably to optimize the aircraft's exit from the climb circuit by computing a new trajectory of the exit HOLD in such a way that the aircraft attains its setpoint altitude permitting it to leave the waiting circuit substantially before traversing the exit HOLD lock-on point.

Advantageously, the method of adjusting the trajectory of an aircraft flying a climb circuit, in a phase following a take-off, the climb circuit comprising a substantially helical trajectory corresponding to a succession of portions of trajectories having the form of a racetrack, each racetrack being called a HOLD, the last HOLD, called the exit HOLD, having predefined geometric characteristics and comprising a notable point, denoted FIX_I/O and called the lock-on point, defined in latitude and in longitude allowing the aircraft to enter and to exit in the exit HOLD, the aircraft attaining a setpoint altitude of the climb circuit during the flight of the exit HOLD, the aircraft being able to exit the exit HOLD once the setpoint altitude has been attained and the lock-on point traversed and to begin a cruising flight, is characterized in that a computer of the aircraft makes it possible to perform:

a first step of computing the prediction of the position of the aircraft in the climb circuit when the setpoint altitude will be attained, the predicted point being denoted EPTA;

a second step of computing the remaining distance to be traveled, denoted DELTA, between the position of the aircraft in the exit HOLD when the setpoint altitude will be attained and the lock-on point of the climb circuit;

the check of a first condition making it possible to carry out a third step of adapting the form of the initial exit HOLD into a new exit HOLD, denoted optimized HOLD, so as to minimize the remaining distance to be traveled DELTA, the optimized HOLD passing through the lock-on point.

Advantageously, the initial exit HOLD comprises two portions each forming a semi-circular arc of the same radius and two rectilinear portions of the same length joining the two semicircles.

Advantageously, the third step is carried out when a first condition is satisfied, the first condition satisfying the fact that DELTA is greater than a certain predefined constant, denoted ALPHA, corresponding to the stopping distance for the optimization of the size of the exit HOLD.

Advantageously, the third step comprises a first adaptation of the exit HOLD whose optimized form corresponding to a complete circle of the same radius as the two semicircles of the initial exit HOLD, the first adaptation being carried out when the remaining distance to be traveled on the exit HOLD, DELTA, is less than the perimeter of the complete circle.

Advantageously, the third step comprises a second adaptation of the exit HOLD, whose form corresponding to a reduced racetrack, the initial rectilinear portions being reduced by one and the same length, the two semicircles remaining of the same size, the second adaptation being carried out when the remaining distance to be traveled on the exit HOLD, DELTA, is greater than the perimeter of the complete circle.

Advantageously, the length of each reduced rectilinear portion of the optimized HOLD is substantially equal to half the sum of:

the distance between the position of the point of attainment of the setpoint altitude in the exit HOLD and the position of the lock-on point FIX_I/O of the exit HOLD;

a margin distance, denoted THETA, corresponding to the time necessary to recompute a new trajectory using the computer of the aircraft;

the negative value of the length of a semicircle of the HOLD.

Advantageously, the margin distance THETA is substantially equal to half the radius of a semicircle of the exit HOLD.

Advantageously, the constant ALPHA is substantially equal to the perimeter of the circle having as radius, the radius of the semicircles of the exit HOLD.

Advantageously, the constant ALPHA is substantially equal either:

to the perimeter of the circle having as radius, the radius of the semicircles of the exit HOLD, when the length between the point of attainment of the setpoint altitude and the lock-on point is greater than the perimeter of the circle having as radius, the radius of the semicircles of the exit HOLD to the value of the margin distance, THETA, when the length between the point of attainment of the setpoint altitude and the exit point is less than the perimeter of the circle having as radius, the radius of the semicircles of the exit HOLD.

Advantageously, a first HOLD has been optimized, a second condition is satisfied before performing a new prediction of the position of the aircraft in the climb circuit when the setpoint altitude will be attained.

Advantageously, the second condition satisfies the fact that the new position of attainment of the setpoint altitude in the optimized HOLD is situated just after the lock-on point.

Advantageously, the avionics system comprises:
- a navigation database, denoted NAVDB, making it possible to construct geographical routes and procedures using data included in the bases;
- a performance database, denoted PRF DB, containing the craft's aerodynamic and engine parameters;
- a computer, denoted FPLN, generating a flight plan and making it possible to input the geographical elements constituting the skeleton of the route to be followed, the said elements being stored in the navigation database;
- a navigation computer, denoted LOCNAV, making it possible to perform the location of the aircraft as a function of geo-location means;
- a lateral trajectories computer, denoted TRAJ, which makes it possible to construct a continuous trajectory using the points of the flight plan that arise from the navigation database;
- a vertical trajectories computer, denoted PRED, making it possible to construct an optimized vertical profile on the lateral trajectory and data of the performance database.

Advantageously, the first step of the method is activated using an interface for managing the flight plan, a new trajectory being generated between:
- the aircraft's current position determined using the navigation computer; and
- the point of attainment of a setpoint altitude in the exit HOLD using the computers of trajectories TRAJ and PRED and the performance database.

BRIEF DESCRIPTION OF THE DRAWINGS

Other characteristics and advantages of the invention will become apparent with the aid of the description which follows, given in regard to the appended drawings which represent.

DETAILED DESCRIPTION

Figure 2:
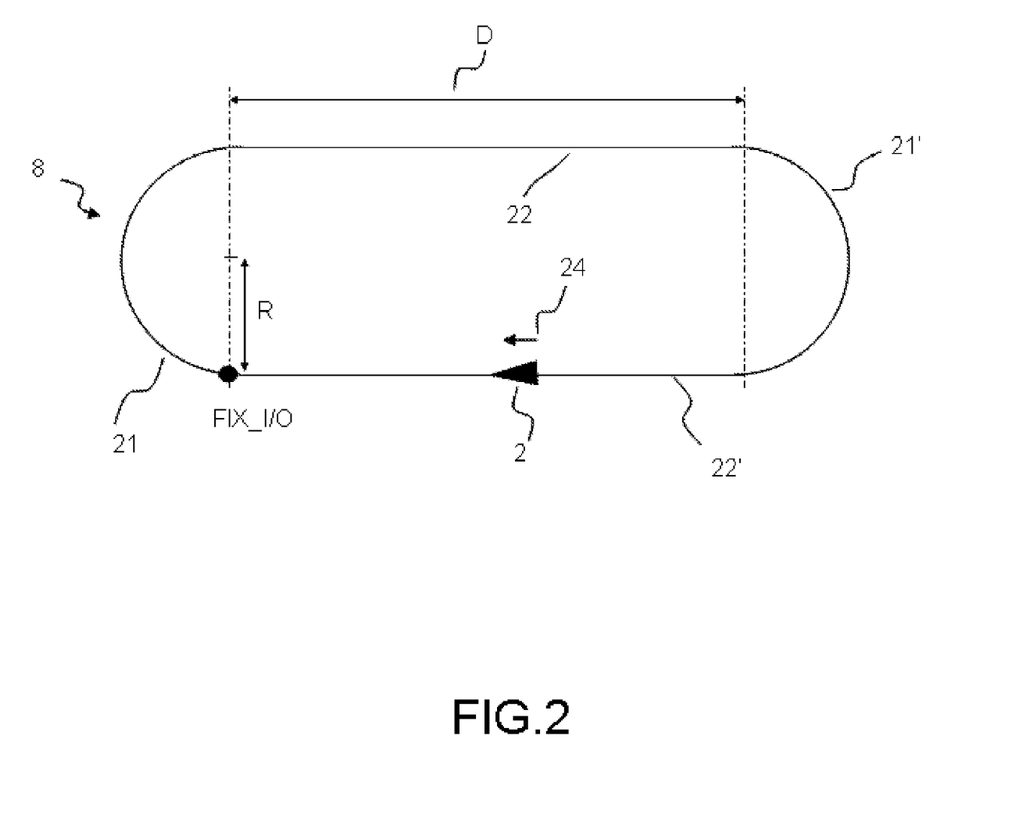
FIG. 2: a climb racetrack and its geometric characteristics.

FIG. 2 represents the geometric characteristics of a HOLD 8 in a 2D view, the altitude axis not being represented. The HOLD comprises two portions each forming a semicircle 21, 21' and two portions each forming two rectilinear segments 22, 22' joining the two semicircles 21, 21'.

An entry and exit point denoted FIX_I/O in the figure, also called the lock-on point of the HOLD allows the aircraft to exit and to enter the HOLD. The lock-on point FIX_I/O comprises latitude and longitude coordinates. The HOLD being flown within the framework of the invention in ascent, the lock-on point does not comprise any altitude-related coordinate.

On the other hand, an altitude setpoint ALT3 allows the FMS to compute the moment onwards of which it can leave the climb circuit so as to continue its flight as soon as the lock-on point will be flown at this altitude.

A HOLD such as represented in FIG. 2 can be flown automatically using the generation of the trajectory by way of the computer of the FMS, it is then denoted HA, or manually by the pilot's commands, it is then denoted HM.

A HOLD comprises several geometric characteristics, notably a radius R defining the radius of the two semicircles 21, 21', a distance D for the rectilinear portions 22, 22', the orientation of the HOLD in space, it may involve a heading expressed with respect to North, it is generally called the "Bearing", and finally the position of the lock-on point FIX_I/O expressed using the latitude and longitude coordinates.

An altitude can be defined beyond which the HOLD is no longer flown.

The characteristics of the HOLD are defined in part using the characteristics of the aircraft, such as the radius of curvature of the circular arc portions 21, 21'.

A HOLD 8 also comprises a preferential direction 24 for flying the trajectory forming a racetrack.

The aim of a segment HA is to make the aircraft climb automatically to a certain setpoint altitude before continuing the route onwards of the lock-on point FIX_I/O.

Figure 3:
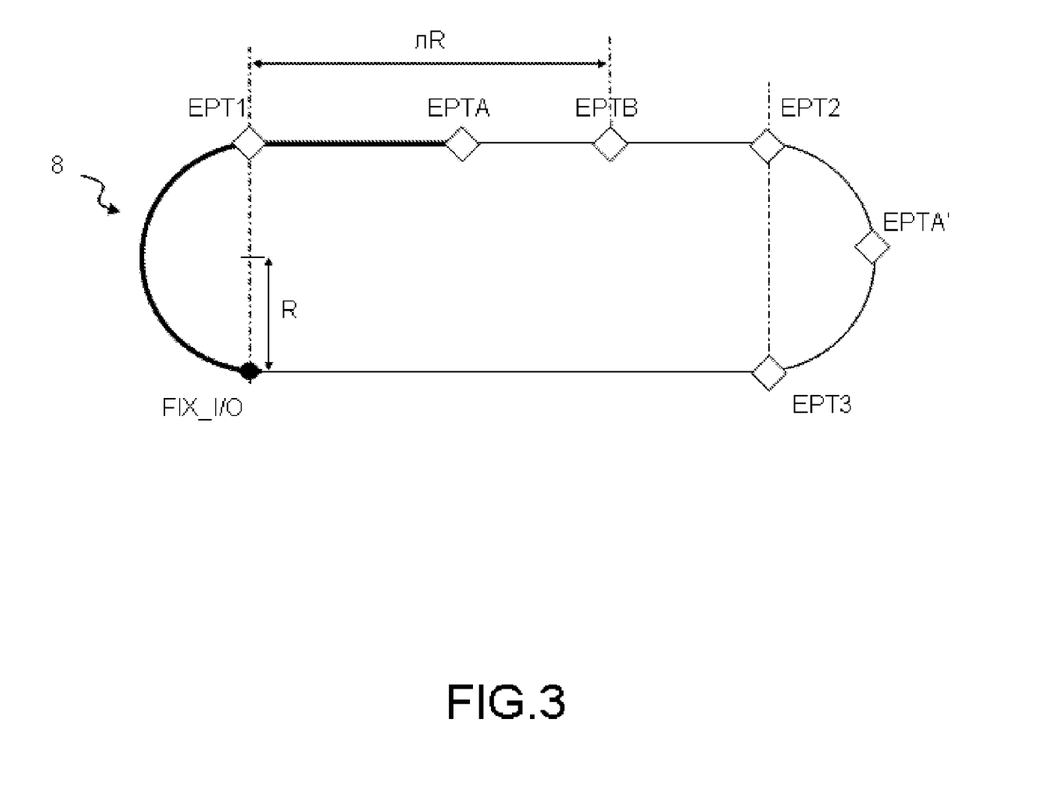
FIG. 3: an exit racetrack comprising the forecast point of arrival at the exit altitude.

FIG. 3 represents the exit HOLD 8 comprising notable points.

The aircraft enters the exit HOLD through the point FIX_I/O and then travels in a semicircle up to the point EPT1 at the junction of the first circular portion flown and the following rectilinear portion. The aircraft flies these two portions while gaining altitude, its form therefore being in a 3D view a substantially helical shape.

In FIG. 3, the four points FIX_I/O, EPT1, EPT2 and EPT3 are notable points which make it possible to join the trajectory portions of a HOLD, notably semicircle portions to the rectilinear portions.

The invention makes it possible to adopt a strategy for adapting the size of the exit HOLD so as to bring the aircraft back as rapidly as possible to the lock-on point once the altitude setpoint has been traversed.

For this purpose a notable point EPTB is used to adopt a strategy as a function of the position at which the aircraft will attain the altitude setpoint.

The point EPTB is placed on the exit HOLD in such a way that the distance between EPT1 and EPTB is equal to $\pi R$, the latter corresponding to half the perimeter of the circle of radius R. This portion is therefore also equal to the portion joining the point FIX_I/O and the point EPTB.

Two cases are then possible when at the position of the point EPTA or EPTA' on the exit HOLD, the subsequent description details the strategy of the method for optimizing the size of the exit HOLD.

A first case corresponds to a position of the point EPTA situated between the point FIX_I/O and the point EPTB, the HOLD being flown in the direction defined in FIG. 2.

The aircraft must travel without optimization of the size of the constant-altitude HOLD the end of the first rectilinear segment up to the point EPT2 and then it commences the second circular portion of radius R joining the point EPT2 to the point EPT3 and finally it flies the last rectilinear portion joining EPT3 to the point FIX_I/O so that it can leave the HOLD.

In a second case, the aircraft attains the exit altitude after the point EPTB for example at the point EPTA' positioned in FIG. 3 in the second semicircle joining the point EPT2 to the point EPT3.

So that the aircraft does not needlessly travel a constant-altitude trajectory portion, the invention makes it possible to adapt the size of the HOLD as a function of the position of the point of arrival EPTA, EPTA' at the altitude setpoint with respect to its position of the point EPTB.

The solution of the invention makes it possible to correct the size of the exit HOLD of the climb circuit during a phase of predictions, that is to say before its overflight, so as to obtain that the specified exit altitude is effective on the lock-on point, taking a margin distance into account.

The margin distance is a minimum distance which makes it possible to recompute a new optimized trajectory, in the subsequent description this margin distance will be denoted THETA.

More particularly, the invention resides in the method for minimizing the distance traveled in the last lap of the HOLD segment by deleting all or part of the portion on which the aircraft moves at constant altitude.

An advantage of the invention, by way of the optimization of the size of the exit HOLD, is to save flight time and thus to minimize fuel consumption.

The distance DELTA denotes the distance from the point EPTA to the point FIX_I/O when the HOLD is flown in the direction defined in FIG. 2 at constant altitude.

Figure 4A:
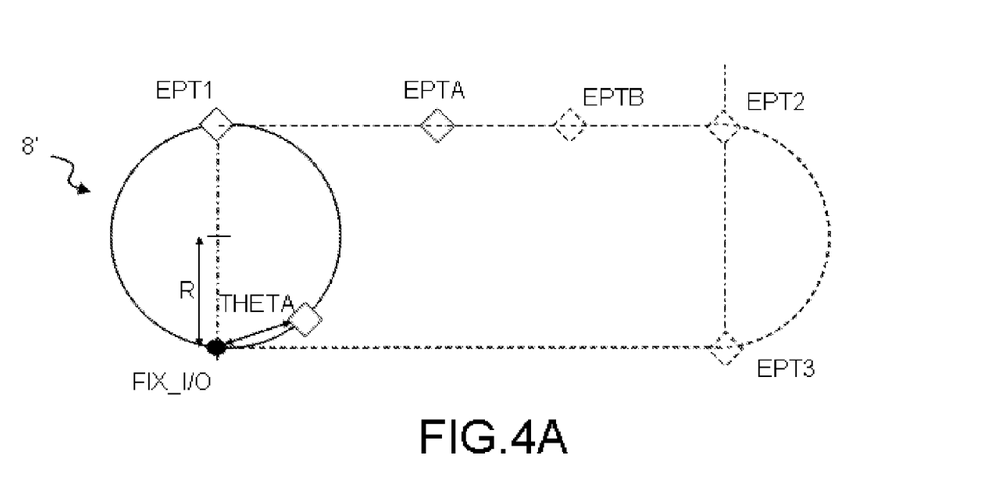
FIG. 4A: an exit racetrack having a first adaptation shape using the method according to the invention.
Figure 4B:
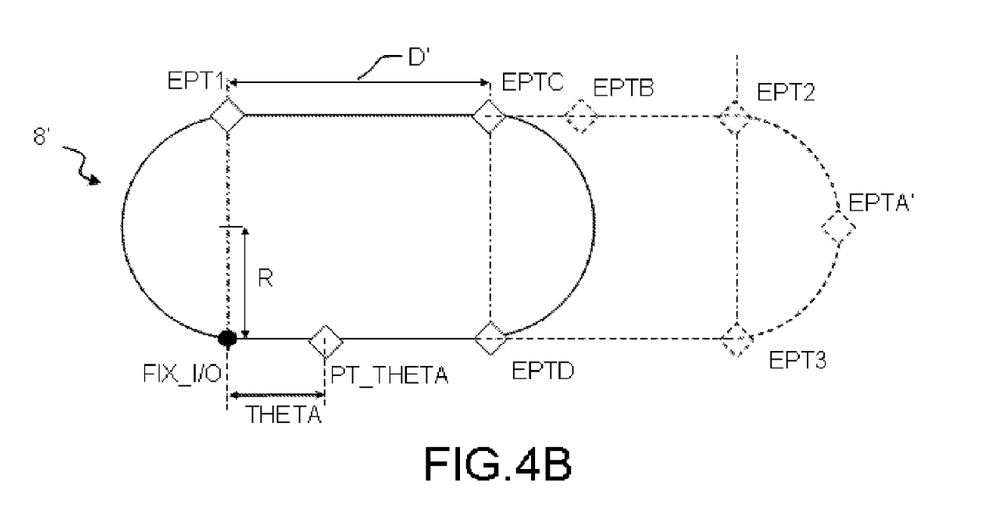
FIG. 4B: an exit racetrack having a second adaptation shape using the method according to the invention.

FIG. 4 represents the adaptations 8' of the exit HOLD 8 as a function of the prediction of the position of the point EPTA, EPTA' corresponding to the point at which the aircraft has attained the setpoint altitude.

On the basis of the current position of the aircraft, of an altitude setpoint and of the aircraft parameters, the computer of the FMS can compute the point of arrival of the aircraft in the exit HOLD 8 when the required exit setpoint altitude will be attained.

The distance of the rectilinear portions joining the points EPT1 and EPT2 is denoted D, this distance being equal to the distance between the points EPT3 and FIX_I/O.

In a first case, if the prediction of the position computed by the FMS of the point EPTA is situated between the lock-on point FIX_I/O and the point EPTB then the trajectory optimized by the method of the invention is a circle of radius R represented in FIG. 4A having as centre the centre of the semicircle passing through the point FIX_I/O.

In a second case, if the prediction of the position computed by the FMS of the point EPTA' is situated between the point EPTB and the lock-on point FIX_I/O then the trajectory optimized by the method of the invention is a HOLD of reduced size, the length of whose rectilinear portions is adjusted and presented in FIG. 4B.

This adapted trajectory is composed of the following trajectory portions:
  the portion of circular arc, having unchanged radius R, joining the points FIX_I/O to the point EPT1;
  the rectilinear portion joining the point EPT1 to a new point EPTC computed on the first rectilinear portion;
  a portion of circular arc, having unchanged radius R, joining the point EPTC to a new point EPTD, computed on the second rectilinear portion;
  the rectilinear portion joining the new point EPTD to the lock-on point FIX_I/O.

The points EPTC and EPTD are the points of transitions between the straight segments and the curved segments.

The distance of the rectilinear portions joining the points EPT1 and EPTC is denoted D', this distance being equal to the distance between the points EPTD and FIX_I/O.

The computer of the FMS makes it possible to compute their position in such a way that $D'=[DELTA+THETA-\pi \cdot R]/2$.

This equality being effected to tolerated errors and approximations of the computer of the FMS.

The constant THETA corresponding to the margin distance for recomputing a new optimized trajectory. This distance corresponds to the margin distance required so as not to place a point EPTA' of attainment of the altitude setpoint in the exit HOLD after the lock-on point FIX_I/O.

A point PT_THETA corresponds to the position of the point situated before the lock-on point at a distance equal to the margin distance for recomputing a new optimized trajectory.

In a preferred embodiment, to a first approximation, the constant THETA can be substantially equal to the value of the radius of the semicircle of the HOLD divided by two, that is to say R/2.

The invention proposes a method making it possible to prepare and compute the new trajectory corresponding to the adaptation of the exit HOLD.

A first step comprises the computation by the FMS of the position of the point EPTA corresponding to the attainment by the aircraft of an altitude setpoint.

The advantage of this step is to construct the trajectory of the segment HA without optimization and to identify the position "EPTA" on which the altitude exit condition for the segment HA is attained.

A second step of the method according to the invention makes it possible to compute, using the FMS, the distance DELTA on the last lap of the HOLD before the exit of the aircraft at the lock-on point FIX_I/O.

The advantage of this step is to measure the distance DELTA while the size of the exit HOLD is not yet optimized. This distance corresponds to the distance that the aircraft will theoretically travel between the position of attainment of the altitude setpoint EPTA, EPTA' and the lock-on point FIX_I/O.

A prediction computation makes it possible to determine the position of the point EPTA, EPTA' and the distance DELTA.

A third step of the method according to the invention makes it possible to compute an optimized trajectory of the segment HA, so as to minimize DELTA.

The advantage of this step is to propose a new trajectory on which the value of DELTA is minimized.

Advantageously, a first condition for carrying out this third step is to compare the value of DELTA with a constant, denoted ALPHA, and corresponding to the stopping distance for the optimization of the segment HA, with as acceptance of the first condition: "as long as DELTA is greater than ALPHA, then the third step can be carried out".

This first condition fixes the stopping condition on the basis of which it is considered that the value of the distance DELTA is minimized.

In the construction of this optimized trajectory by the FMS, an objective is to make EPTA as close as possible to the lock-on point FIX_I/O of the exit HOLD, without ever overstepping it.

In an embodiment of the invention, to a first approximation, the value of the constant ALPHA for the computation of the first condition is $2\pi \cdot R$.

It always holds, by construction, that the constant ALPHA is always positive and less than the total lap distance of the HOLD.

A variant embodiment of the method of the invention can permit a variable value of the constant ALPHA to be defined, dependent on the position of the point EPTA or EPTA' in the HOLD.

For example, if the point EPTA is situated between the lock-on point FIX_I/O and the point EPTB then ALPHA is substantially equal to $2\pi \cdot R$ and the optimized trajectory corresponds to a circle.

If the point EPTA is situated between the point EPTB and FIX_I/O then the value of the constant ALPHA is substantially equal to the value of the constant THETA.

The robustness of the method according to the invention can be improved by adding a second condition for carrying out the third step. This second condition makes it possible to avoid a typical case, where subsequent to a trajectory optimization by the computer of the FMS, a position of the point EPTA is computed after the lock-on point FIX_I/O, compelling the aircraft to perform another lap of the HOLD.

This second condition consists in comparing the position of the point EPTA with respect to that of the lock-on point FIX_I/O. This check corresponds to a robustness test of the method according to the invention.

Notably such a configuration can arise when there is a strong wind at the HOLD exit altitude, this second condition can then be used. The wind braking the aircraft in a first rectilinear segment of the HOLD, while accelerating it in the second segment, it is possible that the theoretical point EPTA initially computed may be obliged to change position.

When the optimization method is readjusted, for example on entry to the exit HOLD, it is possible on the basis of this second condition to intervene so as to change strategy for adapting the HOLD.

This typical case may occur in so far as the wind applies differently on the optimized trajectory and may thus shift the point EPTA after the lock-on point FIX_I/O whereas the computer of the FMS had positioned, by construction, the point EPTA before the point FIX_I/O.

An advantage of the use of the variable THETA is to attenuate this problem by leaving a buffer zone which affords the pilot a margin of manoeuvre.

Figure 5:
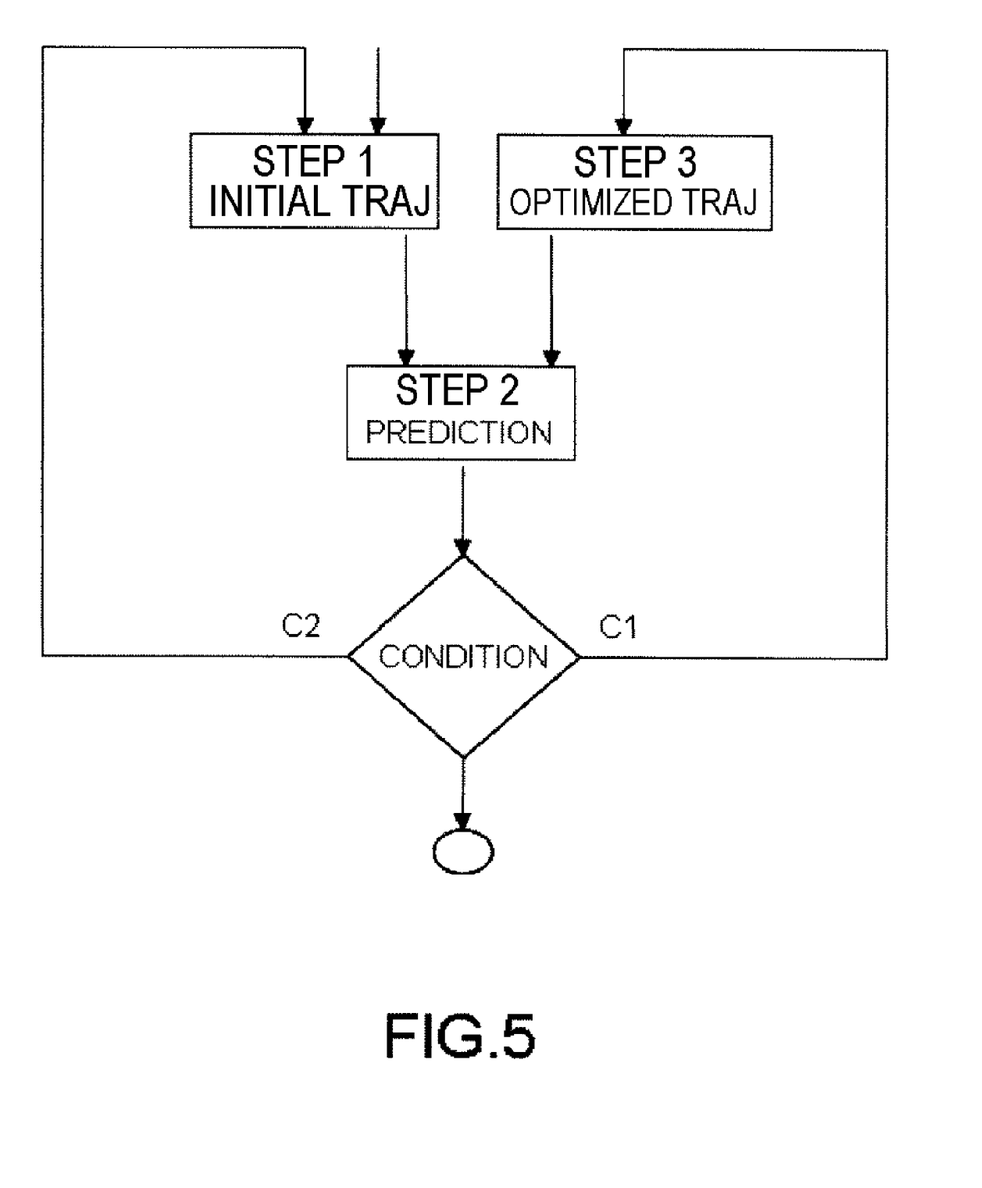
FIG. 5: the various steps of the method of the invention.

FIG. 5 represents the various steps of the method according to the invention.

The first step, denoted INITIAL TRAJ, comprises a computation of the theoretical trajectory up to the point of attainment of the altitude setpoint in the exit HOLD.

The second step, denoted PREDICTION, makes it possible using the computer of the FMS to predict the distance remaining to be traveled by the aircraft between the scheduled point of attainment of the setpoint altitude and the point of exit of the HOLD at the level of the lock-on point.

The third step, denoted OPTIMIZED TRAJ, comprises a computation of a new trajectory of the aircraft in the exit HOLD in such a way that the latter attains the setpoint altitude in proximity to the lock-on point while not overstepping it.

Advantageously, the step of generating a new optimized trajectory is carried out when the first condition C1 is fulfilled.

Advantageously, the second condition C2 is applied to the step of generating a new trajectory by taking into account the HOLD optimized during step 3.

Advantageously, the aircraft comprises an avionics system comprising a computer, denoted FPLN, generating a flight plan and making it possible to input the geographical elements constituting the skeleton of the route to be followed. Notably the departure and arrival procedures, the waypoints and the portions of aerial routes are taken into account when generating the flight plan.

Advantageously, the avionics system also comprises a navigation computer, denoted LOCNAV, making it possible to perform optimal location of the aircraft as a function of the geo-location means, such as the geo-location systems of GPS, GALILEO type or VHF radio beacons or else inertial platforms.

Advantageously, the avionics system also comprises a lateral trajectories computer, denoted TRAJ, which makes it possible to construct a continuous trajectory using the points of the flight plan, complying with aircraft performance and with confinement constraints.

Advantageously, the avionics system also comprises a vertical trajectories computer, denoted PRED, making it possible to construct an optimized vertical profile on the lateral trajectory.

The avionics system also comprises aeronautical databases for generating the aircraft's trajectories.

Notably, the avionics system comprises a navigation database, denoted NAVDB, making it possible to construct geographical routes and procedures using data included in the bases, such as points, beacons, interception or altitude LEGS.

The avionics system also comprises a performance database, denoted PRF DB, containing the craft's aerodynamic and engine parameters. It is notably used to compute the radii of curvature of the semicircles of the HOLDs of the altitude climb circuit.

The flight plan is configured by the pilot using data contained in the navigation database or by data link coming from the air traffic control for example.

The flight plan is designed using a succession of segments called LEGS in aeronautical terminology which are formed of a termination and of a geometry, such as a turn, a great circle, or a rhumb line.

These LEGS are standardized at the international level in an AEEC document, of the ARINC 424 standard.

The pilot thereafter configures the aircraft parameters, such as the weight, the flight plan, the spread of cruising levels and generally one or more optimization criteria.

These inputs allow computers TRAJ and PRED to compute respectively the lateral trajectory and the vertical profile, notably in altitude and in speed, which minimizes a fuel cost criterion.

Generally, using this configuration, the FMS can provide a speed profile in relation to the altitude and deliver predictions of arrival points as a function of a setpoint, for example an altitude setpoint, in a flight plan.

What is claimed is:

1. A method of adjusting the trajectory of an aircraft flying a climb circuit, in a phase following a takeoff, the climb circuit comprising a substantially helical trajectory corresponding to a succession of portions of trajectories having the form of a racetrack, each racetrack being called a HOLD, the last HOLD, called the exit HOLD, having predefined geometric characteristics and comprising a notable point, denoted FIX_I/O and called the lock-on point, defined in latitude and in longitude allowing the aircraft to enter and to exit in the exit HOLD, the aircraft attaining a setpoint altitude of the climb circuit during the flight of the exit HOLD, the aircraft being able to exit the exit HOLD once the setpoint altitude has been attained and the lock-on point traversed and to begin a cruising flight, wherein a computer of the aircraft makes it possible to perform:

a first step of computing the prediction of the position of the aircraft in the climb circuit when the setpoint altitude will be attained, the predicted point being denoted EPTA;

a second step of computing the remaining distance to be traveled, denoted DELTA, between the position of the aircraft in the exit HOLD when the setpoint altitude will be attained and the lock-on point of the climb circuit;

the check of a first condition making it possible to carry out a third step of adapting the form of the initial exit HOLD into a new exit HOLD, denoted optimized HOLD, so as to minimize the remaining distance to be traveled, the optimized HOLD passing through the lock-on point.

2. A method of adjusting the trajectory of an aircraft flying a climb circuit, according to claim 1, wherein the initial exit HOLD comprises two portions each forming a semicircle of the same radius and two rectilinear portions of the same length joining the two semicircles.

3. A method of adjusting the trajectory of an aircraft flying a climb circuit, according to claim 2, wherein the third step is carried out when a first condition is satisfied, the first condition satisfying the fact that the distance DELTA is greater than a first predefined constant, denoted ALPHA, corresponding to the stopping distance for the optimization of the size of the exit HOLD.

4. A method of adjusting the trajectory of an aircraft flying a climb circuit, according to claim 3, wherein the third step comprises a first adaptation of the exit HOLD whose optimized form corresponding to a first complete circle of the same radius as the two semicircles of the initial exit HOLD, the first adaptation being carried out when the remaining distance to be traveled on the exit HOLD is less than the perimeter of the first circle.

5. A method of adjusting the trajectory of an aircraft flying a climb circuit, according to claim 3, wherein the third step comprises a second adaptation of the exit HOLD, whose form corresponding to a reduced racetrack, the initial rectilinear portions being reduced by one and the same length, the two semicircles remaining of the same size, the second adaptation being carried out when the remaining distance to be traveled on the exit HOLD is greater than the perimeter of the first circle.

6. A method of adjusting the trajectory of an aircraft flying a climb circuit, according to claim 5, wherein the length of each reduced rectilinear portion of the optimized HOLD is substantially equal to half the sum of:

the distance between the position of the point of attainment of the setpoint altitude in the exit HOLD and the position of the lock-on point FIX_I/O of the exit HOLD;

a margin distance, denoted THETA, corresponding to the time necessary to recompute a new trajectory using the computer of the aircraft;

the negative value of the length of a semicircle of the HOLD.

7. A method of adjusting the trajectory of an aircraft flying a climb circuit, according to claim 6, wherein the margin distance THETA is substantially equal to half the radius of a semicircle of the exit HOLD.

8. A method of adjusting the trajectory of an aircraft flying a climb circuit, according to claim 6, wherein the first constant is substantially equal to either:

the perimeter of the circle having as radius, the radius of the semicircles of the exit HOLD, when the length between the lock-on point and the point of attainment of the setpoint altitude is less than the perimeter of the circle having as radius, the radius of the semicircles of the exit HOLD, the said length being measured using the lock-on point and in the direction of flight of the aircraft; or the value of the margin distance, when the length between the lock-on point and the point of attainment of the setpoint altitude is greater than the perimeter of the circle having as radius, the radius of the semicircles of the exit HOLD.

9. A method of adjusting the trajectory of an aircraft flying a climb circuit, according to claim 3, wherein the first constant is substantially equal to the perimeter of the circle having as radius, the radius of the semicircles of the exit HOLD.

10. A method of adjusting the trajectory of an aircraft flying a climb circuit, according to claim 3, wherein when a first optimized HOLD has been computed, a second condition is satisfied before performing a new prediction of the position of the aircraft in the climb circuit when the setpoint altitude will be attained.

11. A method of adjusting the trajectory of an aircraft flying a climb circuit, according to claim 10, wherein the second condition satisfies the fact that the new position of attainment of the setpoint altitude in the optimized HOLD is situated after the lock-on point.

12. An avionics system for an aircraft comprising:

a navigation database, denoted NAVDB, making it possible to construct geographical routes and procedures using data included in the base;

a performance database, denoted PRF DB, containing the aircraft's aerodynamic and engine parameters;

a computer, denoted FPLN, generating a flight plan and making it possible to input the geographical elements constituting the skeleton of the route to be followed, the said elements being stored in the navigation database;

a navigation computer, denoted LOCNAV, making it possible to perform the location of the aircraft as a function of geo-location means;

a lateral trajectories computer, denoted TRAJ, which makes it possible to construct a continuous trajectory using the points of a flight plan that arise from the navigation database;

a vertical trajectories computer, denoted PRED, making it possible to construct an optimized vertical profile on the lateral trajectory and data of the performance database, wherein the first step of the method according to one of the preceding claims is activated using an interface for managing the flight plan, a new trajectory being generated during the time period between:

the aircraft's current position determined using the navigation computer; and the point of attainment of a setpoint altitude in the exit HOLD using the computers of trajectories TRAJ and PRED and the performance database.

* * * * *